United States Patent [19]
Anderson

[11] 3,922,325
[45] Nov. 25, 1975

[54] PREPARATION OF TRIALKYL TRITHIOPHOSPHITES
[75] Inventor: John E. Anderson, Phillips, Tex.
[73] Assignee: Phillips Petroleum Company, Bartlesville, Okla.
[22] Filed: June 21, 1973
[21] Appl. No.: 372,241

[52] U.S. Cl................................. 260/972; 260/967
[51] Int. Cl.² ........................................ C07F 9/202
[58] Field of Search .................................... 260/972

[56] References Cited
UNITED STATES PATENTS
2,943,107  6/1960  Rattenbury et al................. 260/972
3,174,989  3/1965  Warner et al...................... 260/972

Primary Examiner—Richard L. Raymond

[57] ABSTRACT

In the preparation of trialkyl trithiophosphites by the reaction of phosphorus trihalide with alkyl mercaptan, the addition of a few parts per million of water increases the reaction rate and ultimate yield of desired trialkyl trithiophosphite.

9 Claims, No Drawings

PREPARATION OF TRIALKYL TRITHIOPHOSPHITES

FIELD OF THE INVENTION

The invention relates to the production of trialkyl trithiophosphites.

BACKGROUND OF THE INVENTION

The preparation of trialkyl trithiophosphite by various reaction sequences has long been known. One of the predominant methods of preparing the trialkyl trithiophosphites has involved reacting a mercaptan with a phosphorus trihalide. Some of the processes have been commercialized, such as preparing tri-n-butyl trithiophosphite from phosphorus trichloride and n-butyl mercaptan. Reaction rates, however, have been relatively slow, requiring considerable amounts of reactor time. Needed have been process improvements permitting of shorter reaction times with increased yields.

OBJECTS OF THE INVENTION

It is an object of the invention to prepare trialkyl trithiophosphites with increased yields or shorter reaction times, or both.

Other aspects, objects, and advantages of the present invention will become apparent from a study of the disclosure and the appended claims.

SUMMARY OF THE INVENTION

Heretofore, the prior art has taught the necessity of maintaining anhydrous conditions when employing a phosphorus trihalide. Neverless, I have discovered that the addition of a few parts per million of water dramatically increases the reaction rates of a phosphorous trihalide with an alkyl mercaptan and increases the yields of desired product.

DETAILED DESCRIPTION OF THE INVENTION

In the preparation of trialkyl trithiophosphites by the reaction of a phosphorus trihalide with an alkyl mercaptan, the reaction rates are substantially increased, permitting of much shorter reactor times while increasing the yields of desired product, by the addition of a small amount of water to the reaction zone. I employ at least about 50 ppm, and find that water in the range of about 50 to 500 ppm to be preferable, though slightly greater amounts can be employed, if desired, and more preferably about 100 to 350, parts per million of water by volume based on volume of mercaptan charged to the reaction zone.

The reaction of the phosphorus trihalide with the alkyl mercaptan to produce the corresponding alkyl trithiophosphite is believed to occur in step-wise fashion, first to the monoalkyl, then to the dialkyl, lastly to the trialkyl product. The overall reaction can be represented by:

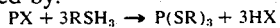

$PX_3 + 3RSH_3 \rightarrow P(SR)_3 + 3HX$ in which R represents an alkyl radical and X a halogen, which can be any of chlorine, bromine or toluene, or combination, or mixture.

It appears that the reaction between the alkyl mercaptan and the phosphorus trihalide proceeds stepwise and that the rate limiting step is the first addition of the mercaptan to the phosphorous trihalide. In the presence of small amounts of water, this initial rate is greatly accelerated. The reaction rate is sufficiently increased that when the final increment of the phosphorus halide has been added this initial step is virtually completed. The reaction temperature then can be raised as quickly as possible to accelerate the other steps of the reaction and to proceed with the removal of gaseous hydrogen halide with dispatch. Of course, while I believe this explanation of my invention to be correct, I would not wish to be limited by a theoretical explanation when I describe and claim a process.

ALKYL MERCAPTANS

Alkyl mercaptans include any suitable one or more alkyl or cycloalkyl mercaptans desired, depending on the molecular weight and structure of the trialkyl trithiophosphite desired as end product. By alkyl I include both the straight and branched chain as well as the cyclo monovalent alkyl radicals. Presently preferred for convenience and availability are those of 1 to 12 carbon atoms, and most preferred at the present time is the butane-1-thiol or n-butyl mercaptan. Other mercaptans which can be used are methane thiol, trimethyl methane thiol, cyclohexane thiol, n-octane-1-thiol, 3,4-dimethyl decane-1-thiol, dodecane-1-thiol, 4-methyl pentane-1-thiol, and the like, or mixtures thereof.

Where the desired trialkyl trithiophosphite is to be a single product in which the R groups are the same, then a single mercaptan is fed to the reaction zone. Where a mixed type product is desired, then a mixture of mercaptans can be utilized.

REACTION CONDITIONS

Strictly speaking, to prepare a trialkyl trithiophosphite from a phosphorus trihalide and an alkyl mercaptan, three moles of alkyl mercaptan are needed per mole of phosphorus trihalide to satisfy stoichiometric requirements. However, in practice, a small excess of mercaptan over the stoichiometric quantity required preferably is employed, such as from about the stoichiometric amount up to an excess of about 10 weight per cent of mercaptan over the stoichiometric requirement. This tends to avoid or minimize formation of mono- and dialkyl trithiophosphites. Larger quantities can be employed, though this represents a considerable excess of mercaptan which, of course, can be ultimately separated and recovered.

While the reaction can be conducted as either continuous or batch operations, in commercial practice a batch operation usually is employed. The alkyl mercaptan together with the desired amount of water is added to the reaction zone. I have found that less than about 50 parts per million of water tend to have insufficient effect. I also have found that much greater than about 500 parts per million of water tend to have undesirable side effects on the phosphorus trihalide. However, between these values, and more preferably in the range of about 100 and 350 parts per million of water by volume based on the volume mercaptan charged to the reactor, the reaction rates are distinctly improved, reaction times are shortened, and product yields are improved.

Prior to charging the mercaptan, the reaction zone preferably is swept with an inert dry gas. After adding the desired amount mercaptan to the reaction zone, preferably in slight excess of the stoichiometric amount, together with the desired amount of moisture, the suitable quantity of phosphorus trihalide is added, preferably with constant mixing. The temperature of the reactants is raised to permit the reaction to proceed, expeditiously, such as to the range of about 80° F to 350° F, preferably about 100° to 300° F, and more preferably about 135° to 240° F. Below about 80° F the reaction rates are quite slow, though feasible, and even here the moisture provides distinct improvement. Above about 350° F, the desired end-product tends to thermally decompose. Pressures utilized should be sufficient to maintain substantially liquid phase operation and to permit reflux of the mercaptan reactant. Pressures in the range of about 400 to 2,000 mm mercuty, perferably and usually atmospheric, are exemplary. In presently preferred practice, after admixing of the alkyl mercaptan, the water, and the phosphorus trihalide, the temperature of the reaction mixture is raised to about the boiling point of the mixture and reflux then is maintained.

Reflux, while it is not a necessity, is a preferred method of practice. A condensing means such as a condenser can be utilized to return mercaptan and any volatilized phosphorus trihalide to the reaction zone, and yet permit by-product hydrogen halide to be withdrawn as formed.

After evolution of hydrogen halide ceases, excess mercaptan can be distilled off, such as by vacuum distillation. The product, primarily trialkyl trithiophosphite, can be purified, if desired, such as by crystallization. Crystallization from such as acetone is one suitable means in the case of normally solid derivatives such as tri-n-butyl trithiophosphite and higher molecular weight products. The n-propyl, n-butyl, and other lower molecular weight low melting products can be purified by such as distilling off of the unreacted mercaptan, and the derivative itself then can be purified by such as vacuum distillation from any heavier by-products which may be present.

Where it is desired to further produce the corresponding trialkyl trithiophosphate, the product mixture containing trialkyl trithiophosphite from the first reaction zone can be treated, preferably in the presence of excess alkyl mercaptan, with an oxidizing agent, such as molecular oxygen, under conditions of temperature and pressure sufficient to effect oxidation of the trithiophosphite to the trithiophosphate. Conditions for such conversion frequently employ temperatures and pressures similarly as are employed for the initial reaction, though preferably employing slightly greater pressures for enhanced oxidation reaction. If desired, the trithiophosphite can be first separated and then oxidized.

The trithiophosphate product then can be purified, such as by water washing, followed by drying, packaging, as may be suitable or convenient.

The trithiophosphites in themselves find application as a component in rocket fuels, as ore flotation agents, additives in rubber compounding, acid inhibitors, and as chemical intermediates for various syntheses, of which preparation of the trialkyl trithiophosphates is of particular interest, since such materials in themselves are useful as defoliants.

EXAMPLES

The examples are intended to provide additional understanding of my invention, and to assist in the disclosure thereof. The particular species employed, amounts, relationships, are intended to be of assistance to the practitioner's skill in the art, without imposing undue limitations on the reasonable scope of my invention.

EXAMPLE I

A typical batch of tri-n-butyltrithiophosphite was prepared by feeding 1,200 gallons of n-butyl mercaptan to an 1,800 gallon stirred reactor provided with steam heating means. The temperature was maintained at 130° F while 300 gallons phosphorous trichloride was added at the rate of 2.5 gallons per minute. The reaction initiated and proceeded slowly during the addition period. After all the reactants had been added, the temperature of the reactor was gradually raised as the reaction proceeded slowly over a 6-hour span to 240° F and maintained at that temperature for about one hour to insure completion of the reaction. The plant operated in this manner for 30 days with a time per batch of tri-n-butyl trithiophosphite averaging about 9.5 hours.

When the process was operated according to the invention, 1,200 gallons of n-butyl mercaptan containing 210 ppm by volume of water were introduced into the reactor. The temperature again was maintained at 130° F while 300 gallons of phosphorous trichloride were gradually added to the reactor. The temperature of the reactor was raised to 240° F as quickly as possible with the equipment available, i.e., about two hours and maintained at that temperature for an additional 40–50 minutes. Based on 61 days of operation, the average batch time for tri-n-butyl trithiophosphite fell to 6.5 hours. It was possible to increase the heating rate to the limit of the equipment capacity because the initial rate of reaction, in the presence of the water, was greatly increased.

Results maintained in operation demonstrate the promoter effect of the water. Over-all reactor yield was increased about 12.2 volume per cent per batch, and production rate increased by about 65.4 volume per cent reflecting increased yield and shortened reaction times.

Certainly, reasonable variations and modifications of my invention are possible yet still within the scope of my disclosure and without departing from the intended scope and spirit thereof.

I claim:

1. A process for the preparation of trialkyl trithiophosphites by the reaction of a phosphorus trihalide with an alkyl mercaptan under reaction conditions wherein the improvement comprises employing in said reaction about 50 to 500 ppm of water by volume based on the amount of said alkyl mercaptan charged to said reaction.

2. The process according to claim 1 employing said water in the range of about 100 to 350 parts per million.

3. The process according to claim 1 wherein said phosphorus trihalide is at least one of phosphorus trichloride, phosphorus tribromide, phosphorus triiodide.

4. The process according to claim 3 wherein said alkyl mercaptan is a straight or branched chain, or a cyclic, mercaptan of up to 12 carbon atoms per molecule, or mixture.

5. A process according to claim 4 wherein said reaction is conducted in the range of about 80° to 350° F.

6. A process according to claim 1 wherein an excess of stoichiometric amount of alkyl mercaptan over the amount of phosphorous trihalide employed is used.

7. A process according to claim 6 wherein an excess stoichiometric amount is about 10 weight per cent.

8. The process according to claim 2 wherein said alkyl mercaptan is n-butyl mercaptan, said phosphorus trihalide is phosphorus trichloride, and the product comprises tri-n-butyl trithiophosphite.

9. The process according to claim 1 wherein the resulting product admixture is treated with a molecular oxygen under conditions of temperature and pressure and an amount of oxygen sufficient to substantially convert said trialkyl trithiophosphite to the corresponding trialkyl trithiophosphate.

* * * * *